United States Patent [19]
Davis et al.

[11] 4,086,683
[45] May 2, 1978

[54] MEAT TENDERIZING APPARATUS

[75] Inventors: Lynn M. Davis, Boca Raton; James V. Theis, Jr., Delray Beach, both of Fla.

[73] Assignee: Hollymatic Corporation, Park Forest, Ill.

[21] Appl. No.: 728,402

[22] Filed: Sep. 30, 1976

[51] Int. Cl.² ............................................. A22C 9/00
[52] U.S. Cl. ........................................ 17/25; 17/28
[58] Field of Search ............... 17/25, 27, 28, 29, 30; 33/175; 24/249 WL; 101/3, 4

[56] References Cited

U.S. PATENT DOCUMENTS

| | | | |
|---|---|---|---|
| 2,322,243 | 6/1943 | Larson et al. | 17/25 |
| 2,348,566 | 5/1944 | Papazian | 101/3 R |
| 2,384,707 | 9/1945 | Sweet | 101/3 R |
| 2,443,826 | 6/1948 | Johnson | 425/236 |
| 2,559,270 | 7/1951 | Abbott | 17/25 |
| 2,668,948 | 2/1954 | Chaney | 24/249 WL |
| 2,688,151 | 9/1954 | Komarik et al. | 17/35 |
| 3,256,801 | 6/1966 | Greenspan | 17/25 |
| 3,499,184 | 3/1970 | Frederick et al. | 17/11 |
| 3,719,504 | 3/1973 | Greenspan et al. | 17/25 |
| 3,736,583 | 5/1973 | Smith et al. | 17/25 X |
| 3,991,439 | 11/1976 | Wagner | 17/25 |

*Primary Examiner*—Louis G. Mancene
*Assistant Examiner*—Paul J. Hirsch
*Attorney, Agent, or Firm*—Wegner, Stellman, McCord, Wiles & Wood

[57] ABSTRACT

A yieldable knife meat tenderizing apparatus particularly for meat that contains bones and including a plurality of elongated knives each comprising a blade with a sharp meat penetrating and meat severing end and a piston on which a blade is mounted in substantial alignment. In order to provide the force yielding feature the apparatus also includes a transverse lock plate having openings through each of which a piston extends and cooperating friction jam means on the piston and the lock plate member having cooperating surfaces for jam locking each piston on the lock plate when the piston is forced into its opening but releasable by reverse movement under preselected reaction force on each piston created by the resistance to the blade entering the meat.

1 Claim, 5 Drawing Figures

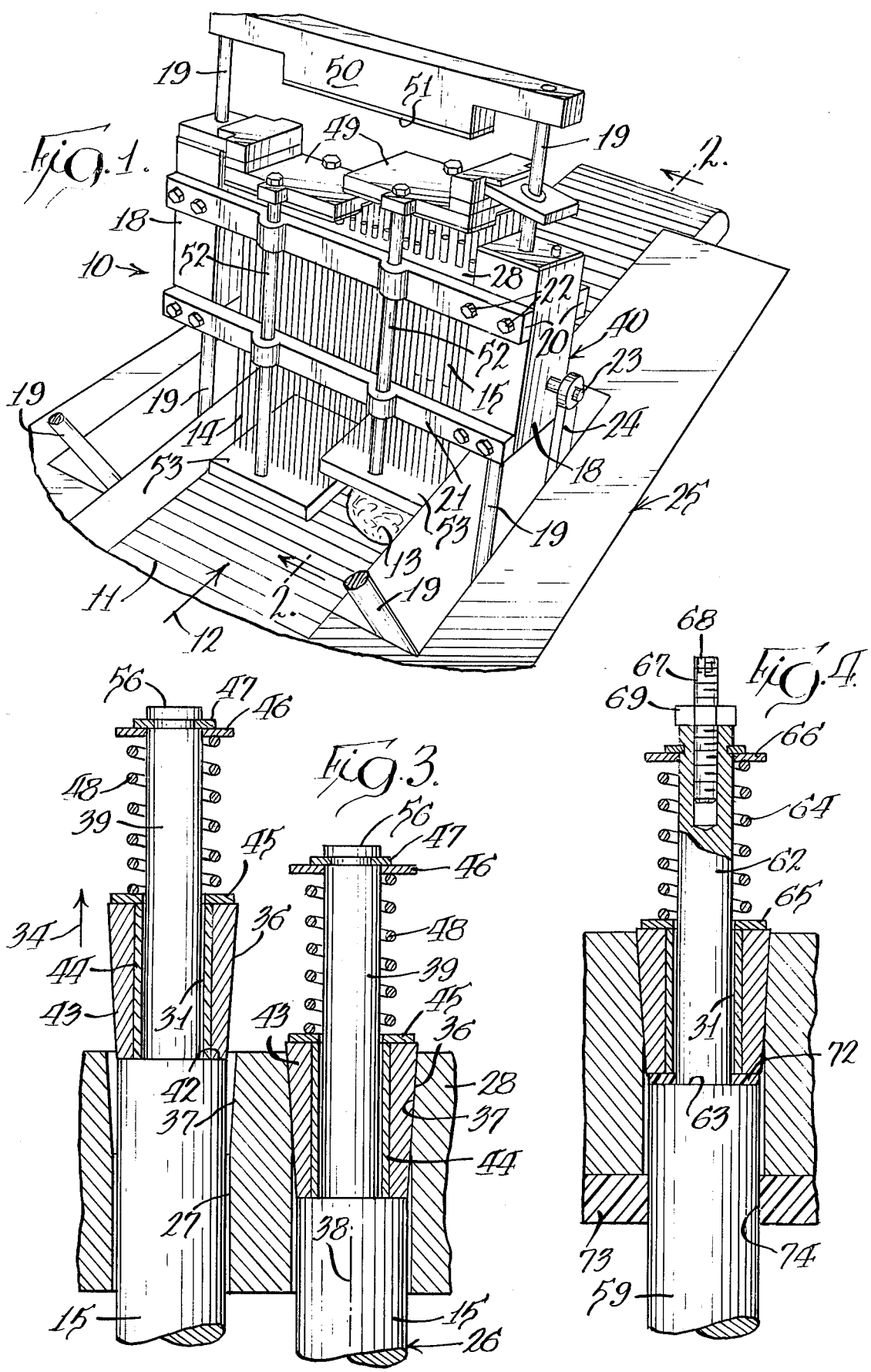

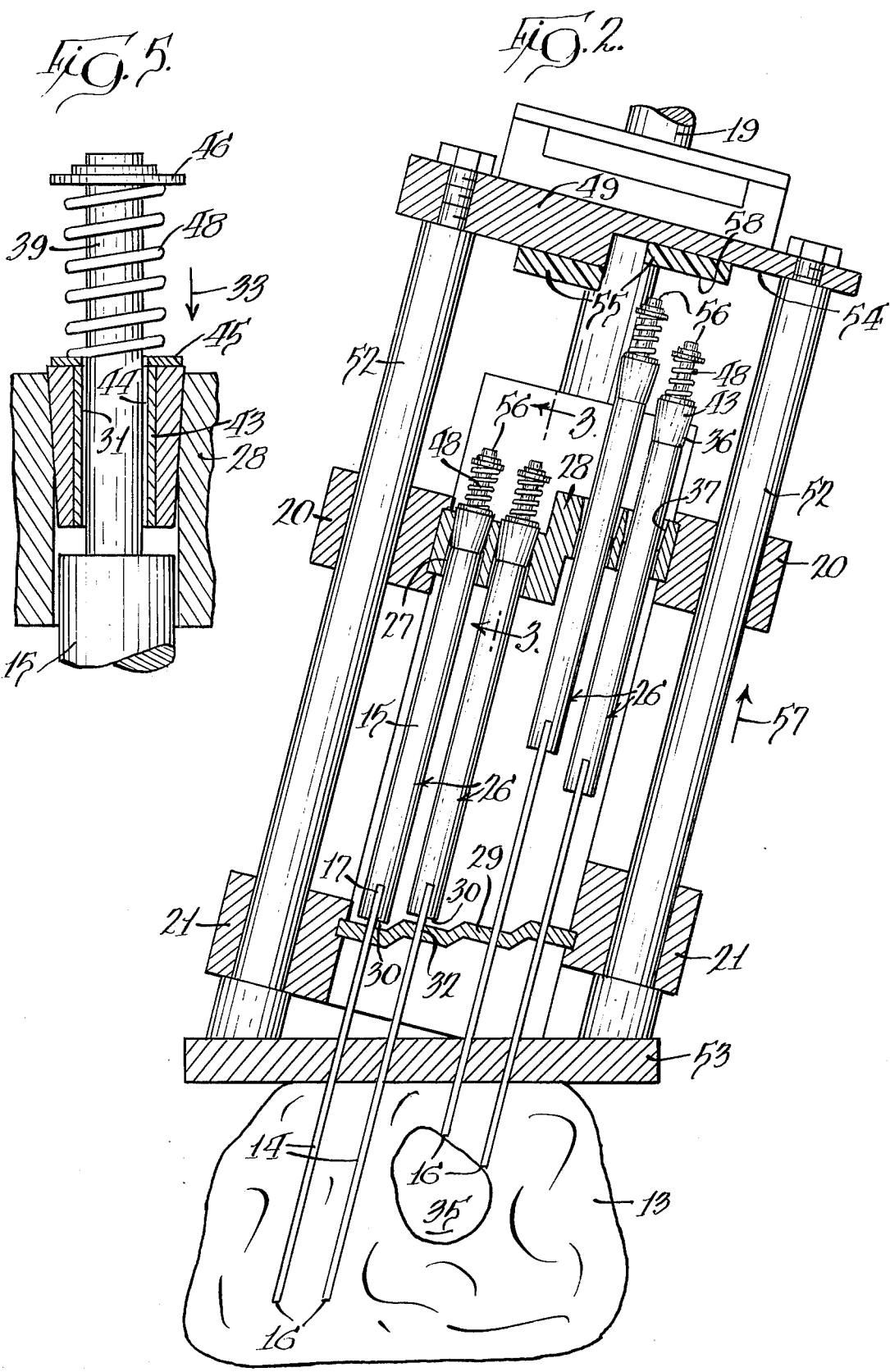

ମEAT TENDERIZING APPARATUS

CROSS REFERENCE TO RELATED PATENT AND APPLICATION

U.S. Pat. No. 3,842,464 discloses and claims an improved yieldable knife tenderizer using elongated knives each comprising a piston and blade combination.

U.S. Pat. No. 3,991,439 discloses and claims one type of yieldable means for a yieldable meat tenderizer.

BACKGROUND OF THE INVENTION

This invention relates to a meat tenderizing apparatus in which long slender knives are reciprocated into and out of meat during a pause in the movement of the meat while it is transported in intermittent movement through the apparatus. The knives are yieldably held by jamming friction members so as to be readily releasable upon a preselected resistance to penetration of the meat by any of the blades such as will occur when a blade strikes a bone. Because of the yieldable jamming arrangement the knife that encounters this resistance is immediately released so that further descent of the other knives in continuing the penetration of the meat in the tenderizing operation is not affected.

BRIEF DESCRIPTION OF THE DRAWINGS

FIG. 1 is a perspective view of a meat tenderizing apparatus embodying the invention but showing only one of the knife carrying reciprocable heads for clarity of illustration instead of the two that are actually used.

FIG. 2 is a fragmentary vertical sectional view taken substantially along line 2—2 of FIG. 1 showing the blades of some of the knives in contact with a bone while the blades of the other knives that were not intercepted by the bone are at their full penetration.

FIG. 3 is an enlarged detailed but fragmentary sectional view taken substantially along line 3—3 of FIG. 2.

FIG. 4 is a view similar to a portion of FIG. 3 but illustrating a second embodiment of the invention.

FIG. 5 is a view similar to a portion of FIG. 3 but showing the additional spring loading to the friction surfaces.

DESCRIPTION OF THE PREFERRED EMBODIMENTS

In the illustrated embodiment of FIGS. 1-3 the invention is illustrated as used with meat that contains bone with each knife yieldable when the corresponding blade strikes a bone in the manner described in the above prior U.S. Pat. No. 3,842,464.

In the embodiment of FIGS. 1-3 the tenderizer 10 includes a meat conveyor 11 that is movable in a direction 12 in increments such as ¼ inch and after each increment the conveyor remains stationary so that the meat 13 carried thereon may be tenderized by the blades 14 each mounted on a piston 15 with each blade 14 having a sharp meat penetrating and meat severing end 16 for penetrating the meat as shown in FIG. 2.

In the illustrated embodiment each piston 15 carries a pair of blades 14 as shown in the above U.S. Pat. No. 3,842,464 and each blade 14 has its upper end 17 mounted on the lower end of a piston 15 so as to be in substantial alignment with the piston.

The apparatus 10 has a pair of reciprocable heads 40 of which only one is shown for clarity of illustration and with each head being guided in angled converging paths on guide rods 19. The angled arrangement of the guide rods 19 and thus the angled travel of the blades 14 relative to the conveyor 11 and thus the meat 13 held thereon is to aid in severing all of the fibers regardless of their orientation relative to the path of travel of the blades. This sloped or angled arrangement as an aid in cutting every fiber or other toughening element of the meat is disclosed and claimed in prior U.S. Pat. No. 3,736,623, and this patent as well as all patents referred to herein are assigned to the present assignee.

The guide blocks 18 are spaced apart on opposite sides of the conveyor 11 and are essentially parallel with each being reciprocable on its own guide rods 19. Each pair of guide blocks 18 is connected by upper 20 and lower 21 pairs of tie bars whose ends are bolted to the guide blocks 18 by bolts illustrated at 22. There are two sets of these tie bars 20 and 21 with each set positioned on opposite sides of the guide blocks 18 and all parallel to each other.

In order to reciprocate the guide blocks 18 of the apparatus on their guide rods 19 each guide block is hingedly attached by an outwardly projecting hinge pin 23 to a drive rod 24 that is driven by a customary electric motor and gears (not shown) in the base of the cabinet 25.

Each knife 26 as stated above comprises the piston 15 and at least one, here shown as two, long slender blades 14 substantially aligned with a piston. Each piston 15 extends through an opening 27 in a lock plate member 28 that is longitudinally transverse to the direction 12 of travel of the conveyor 11. This lock plate member 28 is retained between the pair of upper tie bars 20 as shown in FIG. 2 while the lower pair 21 of tie bars retain a guide plate 29 having small openings 32 through which the individual blades 14 extend for guiding and supporting the blades. In order to have clearance for blades to move down during reset, the bottoms 30 of the piston 15, when in locked position, are spaced above the guide plate 29.

As shown in the embodiment of FIG. 3 the lock plate member 28 and each piston 15 has cooperating friction jam means with cooperating surfaces for jam locking each piston on the lock plate when the piston is forced toward the lock plate by the force illustrated by the arrow 33 but releasable under a preselected reaction force illustrated at 34 that resists the penetration of the meat by the blades of the knife 13.

As illustrated in enlarged detail in FIG. 3 the cooperating friction jam means comprises a first tapered friction surface 36 and a cooperating second tapered friction surface 37 on the lock plate 28. These friction surfaces on the lock plate are of course provided by the openings 27 through which the pistons 15 extend. In the illustrated embodiment the surface 36 as well as the second surface 37 each are angled about 3° from the vertical. The opening 27 beneath the tapered friction surface 37 is generally cylindrical and is larger than the diameter of the corresponding piston 15 only by a very small amount. Both the angles and the clearances are shown exaggerated in the illustrated embodiments of FIGS. 3 and 4 for illustration purposes, and the angle is only meant to be of a self-locking nature and in general any taper that is self-locking will suffice, e.g., up to about 15°.

As can be seen, each of the tapered surfaces 36 and 37 converges toward the central axis 38 of each knife 26 and thus toward the meat penetrating ends 16 of the blades. In addition, as illustrated, these tapered friction surfaces 36 and 37 are located on the side of the lock plate 28 that is away from the conveyor 12 and the meat carried thereon. As shown in the right-hand half 26 of FIG. 3 the friction surfaces 36 and 37 are in substantially full surface contact while the knife pistons 15 are jam locked on the lock plate 28.

In the embodiment of FIGS. 1–3 the piston 15 is provided with a coaxial reduced upper end 39 that provides a shoulder 42 on which is retained an annular plastic sleeve 43 with a typical such sleeve being made of "Rulon" which is a reinforced Teflon with copper being a customary reinforcing agent incorporated in the Teflon. Other typical plastics are nylon and Delrin. This sleeve which is spaced slightly from the end 39 as shown at 31 could well be made of other material such as steel, etc. Between the plastic sleeve 43 and the reduced end 39 is a cylindrical sleeve 44 of steel which is the material of construction also of the knives 26. The sleeve 44 is slidably mounted on end 39.

On top of the upper end of the tapered and cylindrical sleeves 43 and 44 is a washer 45 while spaced therefrom and on the extreme end is another washer 46 held in place by a lock washer 47. Compressed between the two washers 45 and 46 is a helical compression spring 48.

Located above the knives 26 are a pair of reset plates 49 to which are connected the upper ends of pairs of parallel rods 52. These rods which slidably engage the upper and lower tie bars 20 and 21 have connected to their lower ends meat retaining plates 53. The undersurface 54 of each plate 49 is arranged in a step formation as shown in FIG. 2 because of the angled arrangement of the knives 26.

The tops of the pair of guide rods 19 on which are slidably mounted the pair of heads 40 have attached a reset bar 50 on the bottom of which is provided a resilient pad 51. On upward movement of the heads 40 the reset plates 49 engage the pad 51 and apply reset pressure to the upper ends 56 of the knife pistons 15. This serves to lock by jamming the knives on the lock plate member 28 as illustrated by the knife at the right of FIG. 3 and the knives in the embodiments of FIGS. 4 and 5.

As is illustrated by the left pair of knives 26 in FIG. 2, the jammed tapered surfaces 36 and 37 lock the knives to the lock plate 28. However, as shown by the right pair of knives 26 in FIG. 2, any blade end 16 that strikes a bone 35 or similar obstruction or heavy resistance causes the jammed surfaces 36 and 37 to break loose leaving the knives in their elevated position while the other knives continue their penetration. Then, when the heads 40 are retracted in the direction 57 the upper ends 56 of the knife pistons are forced by the reset bar 50 and in turn the reset plate 49 to apply jamming force to the corresponding tapered sleeve 43 and again jam the surfaces 36 and 37 to lock the knives 26 on the lock plate 28. The force of this jamming is of course limited by the amount of force needed to compress the springs 48. This jamming force is illustrated at 33 in FIG. 5. FIG. 5 illustrates the structure when a spring 48 is compressed to apply an additional wedging or jamming force.

With this invention the reaction force 34 set up by the blades 14 striking an obstruction such as a bone 35 causes the surfaces 36 and 37 which are tapered to become unjammed. Because of the provision of the taper which may conveniently be about 3° the necessary amount of reaction movement 34 of each sleeve 43 is very slight in order to unlock the particular knife 26 from the lock plate 28. In one example the extent of this movement to unlock or unjam the surfaces 36 and 37 was less than ⅛ of an inch and could be only a few thousandths of an inch depending on the construction materials. When this occurred the remaining blades 14 such as the two left blades in FIG. 2 that had not struck an obstruction 35 were free to continue their meat penetrating because their surfaces 36 and 37 remained jammed together.

In the embodiment of FIG. 4 the piston 59 has a similarly reduced end 62 and shoulder 63 and this end 62 is also surrounded by a compression spring 64 held between the washers 65 and 66. In this embodiment, however, the effective length of the reduced end 62 in each instance is adjustable by having an adjusting screw 67 threaded to the upper end 62 and extending therebeyond to provide contact surface 68 that is engageable with the reset 50. This set screw 67 once it has been arranged in its adjusted position is locked in this position by a customary lock nut 69.

In this embodiment of FIG. 4 there is provided a plastic washer 72 such as one of polyurethane or other wear resistant material that also functions as a spring 72 in addition to the compression spring 64. Washer 72 cushions the impact as the shoulder 63 of the piston 59 returns to close proximity to the shoulder of sleeve 43 and the loading force is released.

In this embodiment of FIG. 4 there is provided a plastic such as nylon guide plate 73 that serves to guide the movement of the knife pistons 59. This plastic guide plate 73 closely embraces the piston as shown at 74 so as to reduce or avoid metal-to-metal contact between the pistons 59 and the lock plates 28. If desired, the guide plate 73 can be metal different from the metal of the knives. Thus one example is a steel knife piston 59 structure and an aluminum lock plate 73.

Having described our invention as related to the embodiments shown in the accompanying drawings, it is our intention that the invention be not limited by any of the details of description, unless otherwise specified, but rather be construed broadly within its spirit and scope as set out in the appended claims.

We claim:

1. A yieldable knife meat tenderizing apparatus particularly for meat that contains bones, comprising: a plurality of elongated knives each comprising a blade with a sharp meat penetrating and meat severing end and a piston on which said blade is mounted in substantial alignment; a transverse lock plate member having openings through each of which a said piston extends, each said piston comprising an end that is opposite to its said blade extending beyond said lock plate member; cooperating friction jam means on said piston and said lock plate member having cooperating tapered surface means for jam locking each said piston on said lock plate member when the piston is forced toward said lock plate member but releasable under a preselected reaction force on each said piston resisting said meat penetrating; conveyor means for conveying said meat to and from the vicinity of said lock plate member and knives; means for reciprocating said lock plate member and said jammed pistons and thereby said blades toward and away from said conveyor and to and from said meat penetrating positions of said blades; reset means engaged by said extended ends on reciprocation of said lock plate member and knives away from said conveyor for frictionally jamming said friction jam means together, said friction jam means on each said piston comprising a tapered member surrounding and movable relative to each said piston and tapered toward the meat severing end for engagement with a similar tapered surface means on said lock plate member; and spring means on each said extended end of each piston providing a predetermined jamming force on said tapered member when said pistons are reciprocated into engagement with said reset means.

* * * * *